US007654892B2

(12) United States Patent
Pope et al.

(10) Patent No.: US 7,654,892 B2
(45) Date of Patent: Feb. 2, 2010

(54) TAILINGS RE-THRESHER DEFLECTOR (75) Inventors: Glenn Pope, Viola, IL (US); Chad Dow, East Moline, IL (US); Aaron Bruns, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/130,910

(22) Filed: May 30, 2008

(65) Prior Publication Data
US 2009/0143121 A1   Jun. 4, 2009

Related U.S. Application Data (60) Provisional application No. 61/005,004, filed on Nov. 29, 2007.

(51) Int. Cl.
*A01F 12/52* (2006.01)
(52) U.S. Cl. ........................................ 460/13
(58) Field of Classification Search .............. 460/13, 460/14, 111, 112, 75, 76; 56/14.6; 239/661; 241/101.742
See application file for complete search history.

(56) References Cited

U.S. PATENT DOCUMENTS

| 2,507,669 | A | * | 5/1950 | Heth | ........................... | 56/13.3 |
| 3,115,142 | A | * | 12/1963 | Kepkay | ........................ | 460/14 |
| 3,247,855 | A | | 4/1966 | Kepkay | | |
| 3,871,384 | A | * | 3/1975 | Depauw et al. | .............. | 460/109 |
| 3,976,084 | A | * | 8/1976 | Weber | ........................ | 460/14 |
| 4,062,366 | A | * | 12/1977 | De Coene | ..................... | 460/14 |
| 4,305,407 | A | * | 12/1981 | De Coene | ................... | 460/107 |
| 4,307,732 | A | * | 12/1981 | De Busscher et al. | .......... | 460/99 |
| 4,310,004 | A | * | 1/1982 | De Busscher et al. | .......... | 460/14 |
| 4,310,005 | A | * | 1/1982 | De Busscher et al. | .......... | 460/73 |
| 4,312,366 | A | * | 1/1982 | De Busscher et al. | .......... | 460/76 |
| 4,314,571 | A | * | 2/1982 | DeBusscher et al. | .......... | 460/99 |

(Continued)

FOREIGN PATENT DOCUMENTS

DE        711031 C        9/1941

(Continued)

OTHER PUBLICATIONS

European Search Report dated Mar. 20, 2009 (4 pages).

*Primary Examiner*—Árpád Fábián-Kovács
(74) *Attorney, Agent, or Firm*—Erickson Law Group, PC (57) ABSTRACT A re-threshing system for a combine includes a delivery mechanism for transporting tailings from the cleaning section of the combine to a re-threshing apparatus and a bypass that can be used to bypass the tailings around the re-threshing apparatus. The re-threshing apparatus includes a re-threshing housing that at least partially surrounds a re-threshing rotor. The rotor and housing have cooperating threshing elements that act to re-thresh the tailings delivered into the housing and deliver the re-threshed tailings out of a housing outlet into a discharge passage to be directed to the cleaning section of the combine harvester. The delivery mechanism is configured to throw or fling the tailings into an inlet opening of the housing in a direction substantially tangential to the rotor rotating direction. To bypass the re-threshing apparatus, a deflector can be deployed to block the inlet opening and deflect the tailings into a bypass passage that is open to the discharge passage.

24 Claims, 7 Drawing Sheets

U.S. PATENT DOCUMENTS

| | | | |
|---|---|---|---|
| 4,332,262 A * | 6/1982 | De Busscher | 460/75 |
| 4,348,855 A | 9/1982 | DePauw et al. | |
| 4,378,024 A * | 3/1983 | De Busscher et al. | 460/73 |
| 4,466,447 A * | 8/1984 | Hoefer et al. | 460/13 |
| 4,470,420 A | 9/1984 | Hanaway | |
| 4,489,734 A * | 12/1984 | Van Overschelde | 460/81 |
| 4,531,528 A | 7/1985 | Peters | |
| 4,846,198 A * | 7/1989 | Carnewal et al. | 460/21 |
| 4,875,891 A | 10/1989 | Turner et al. | |
| 4,964,838 A | 10/1990 | Cromheecke et al. | |
| 5,021,028 A * | 6/1991 | Kersting et al. | 460/85 |
| 5,112,279 A | 5/1992 | Jensen et al. | |
| 5,344,367 A | 9/1994 | Gerber | |
| 5,376,047 A | 12/1994 | Harden et al. | |
| 5,421,777 A * | 6/1995 | Strubbe et al. | 460/13 |
| 5,445,563 A | 8/1995 | Stickler et al. | |
| 5,497,605 A | 3/1996 | Underwood | |
| 5,498,206 A | 3/1996 | Underwood et al. | |
| 5,688,170 A | 11/1997 | Pfeiffer et al. | |
| 5,833,533 A * | 11/1998 | Roberg | 460/112 |
| 6,036,598 A | 3/2000 | Harden et al. | |
| 6,468,152 B2 | 10/2002 | Moriarty | |
| 6,672,957 B2 | 1/2004 | Voss et al. | |
| 6,758,745 B2 * | 7/2004 | Van Der Haegen et al. | 460/109 |
| 6,884,161 B2 | 4/2005 | Moriarty | |
| 7,025,673 B2 | 4/2006 | Schmidt et al. | |
| 7,070,498 B2 | 7/2006 | Grywacheski et al. | |
| 2002/0128054 A1 | 9/2002 | Lauer | |
| 2005/0009591 A1 * | 1/2005 | Duquesne et al. | 460/107 |
| 2005/0164755 A1 | 7/2005 | Nelson et al. | |

FOREIGN PATENT DOCUMENTS

| | | | |
|---|---|---|---|
| GB | 700767 A | | 12/1953 |
| GB | 2051541 A * | | 1/1981 |

* cited by examiner

TAILINGS RE-THRESHER DEFLECTOR

This application claims the benefit of U.S. provisional patent application Ser. No. 61/005,004 filed Nov. 29, 2007.

FIELD OF THE INVENTION

This invention relates in general to grain harvesting combines, and in particular to a system for re-threshing tailings from the crop cleaning section of a combine.

BACKGROUND OF THE INVENTION

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

A grain harvesting combine has a header which cuts the crop and feeds it upward into a threshing and separating rotor within a housing having a perforated wall. The rotor rotates within the housing, passing grain within clearances between the rotor and perforated housing to thresh grain from the crop.

Rotary combines have one or two large rotors for threshing and separating the harvested crop material. In most rotary combines the rotor or rotors are arranged along the longitudinal axis of the machine. These rotors are provided with an infeed section for receiving harvested crop material, a threshing section for threshing the harvested crop material received from the infeed section and a separating section for freeing grain trapped in the threshed crop material received from the threshing section. Examples are shown in U.S. Pat. Nos. 5,445,563; 5,688,170 and 7,070,498, herein incorporated by reference.

The threshed grain falls onto a grain pan, and from the grain pan onto a set of upper and lower sieves. The sieves are oscillated, causing clean grain to fall through for collection. A blower blows air upward through the sieves, discharging chaff to the rear. Straw from the threshing chamber proceeds through a straw beater and out the rear of the combine.

The clean grain is collected and conveyed to the grain tank. Incompletely threshed grain will not proceed through the fingers of the sieves, yet is too heavy to be blown out the rear along with the chaff. This grain, called "tailings" or "returns" is often returned to the threshing and separating rotor for re-threshing. However, when tailings are returned to the rotor for re-threshing, under some grain conditions, called "white caps", tailings will pass through the rotor yet again without the grain separating from the chaff.

Some prior art grain harvesting combines have dedicated re-threshing rotors for receiving tailings from the sieves, re-threshing the tailings, and passing the tailings back through the primary rotor for re-threshing.

U.S. Pat. No. 5,498,206 discloses a grain combine that includes a primary threshing rotor which rotates to thresh grain from crop, a sieve section for separating grain from chaff, a clean grain conveyor, a clean grain storage tank, and a re-threshing section for re-threshing tailings. The re-threshing section has a re-threshing rotor which receives the tailings from the sieve section. The re-threshing rotor extends completely across an end of the sieve section for rotating about an axis which extends in parallel to the end of the sieve section. The re-threshing rotor includes rasp bars which extend along the end of the sieve section for receiving the tailings and pressing the tailings against a re-threshing pan. Blowers are provided for removing loose chaff from the tailings in the re-threshing section. The re-threshed tailings, including clean grain separated from the tailings by re-threshing, are returned to the primary rotor for re-threshing.

The present inventors have recognized that some prior methods are limited in their ability to prevent grain damage in damage-sensitive crops. The present inventors have recognized that it would be desirable to have the ability to selectively re-thresh tailings depending on the sensitivity of the crop.

SUMMARY OF THE INVENTION

The invention provides a re-threshing system for a combine. The re-threshing system includes a delivery mechanism for transporting tailings from the cleaning section of the combine to a re-threshing apparatus and a bypass that can be used to bypass the tailings around the re-threshing apparatus.

The bypass is particularly advantageous when harvesting sensitive crops such as corn, which can be damaged by aggressive re-threshing.

According to the preferred embodiment the re-threshing apparatus comprises a re-threshing housing that at least partially surrounds a re-threshing rotor. The rotor and housing have cooperating threshing elements that act to re-thresh the tailings delivered into the housing and deliver the re-threshed tailings out of a housing outlet into a discharge passage to be directed to the cleaning section of the combine harvester. The delivery mechanism is configured to throw or fling the tailings into an inlet opening of the housing in a direction substantially tangential to the rotor rotating direction. To bypass the re-threshing apparatus, a deflector can be deployed to block the inlet opening and deflect the tailings into a bypass passage that is open to the discharge passage.

Preferably, the deflector comprises an arcuate plate that smoothly redirects the tailings that are flung from the delivery mechanism into the bypass passage. Preferably, the deflector is mounted on the housing to be pivoted from a standby position wherein the tailings are directed into the housing to be re-threshed, to a deployed position to deflect the tailings into the bypass passage. A manually actuated lever is operatively attached to the deflector to move the deflector between the standby and deployed positions.

The invention provides a method of selectively re-threshing tailings in a combine harvester. The re-threshing section has an inlet and an outlet. There is a bypass path around the re-threshing section. The tailings are selectively directed into either the re-threshing section or into the bypass path to bypass the re-threshing section. The tailings delivered into the re-threshing section are re-threshed. The method can further include re-threshing tailings between the rotary re-threshing device and the housing. Then the tailings are thrown into the housing in a direction substantially tangential to the rotary threshing device, or alternately thrown into the bypass path by use of a deflector having at least two positions, a standby position that allows tangential entry of tailings into the housing, and a deployed position that blocks entry of tailings into the housing and directs tailings into the bypass.

Although the invention is illustrated as being used on a rotary combine, the present invention can be used on other combine types including conventional straw walker combines and hybrid combines having transverse threshing cylinders and rotary separators.

Numerous other advantages and features of the present invention will be become readily apparent from the following detailed description of the invention and the embodiments thereof, and from the accompanying drawings.

DETAILED DESCRIPTION OF THE PREFERRED EMBODIMENTS

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 1:
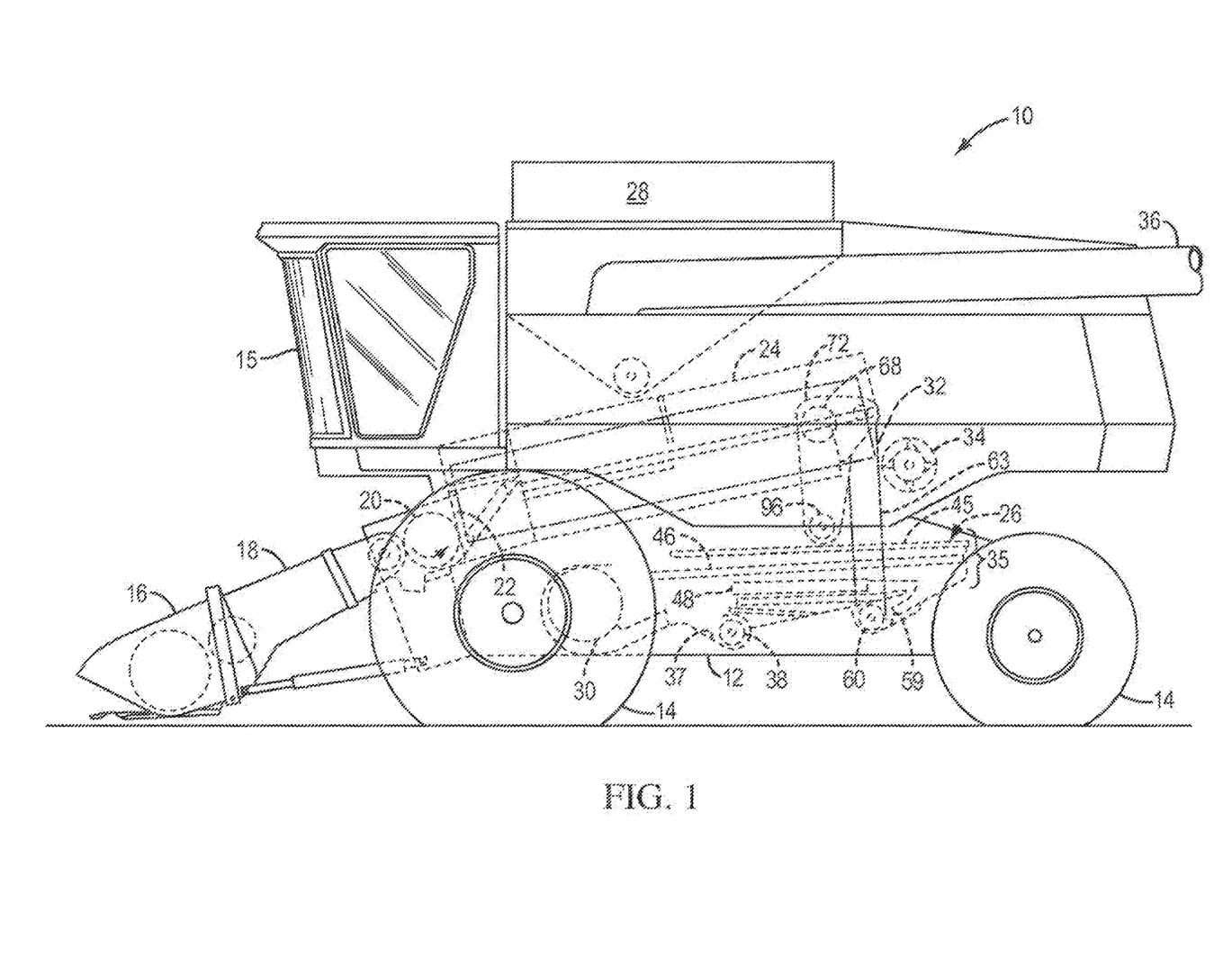
FIG. 1 is a diagrammatic side view of an agricultural combine the present invention.

FIG. 1 shows an agricultural combine 10 comprising a supporting structure 12 having ground engaging wheels 14 extending from the supporting structure. The operation of the combine is controlled from an operator's cab 15. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit 24 threshes and separates the harvested crop material. Grain and chaff fall through grates on the bottom of the unit 24 to the cleaning system 26. The cleaning system 26 removes the chaff and directs the clean grain to a clean grain elevator (not shown). The clean grain elevator deposits the clean grain in a grain tank 28. The clean grain in the tank 28 can be unloaded into a grain cart or truck by unloading auger 36. Threshed and separated straw is discharged from the axial crop processing unit 24 through outlet 32 to discharge beater 34. The discharge beater 34 in turn propels the straw out the rear of the combine.

Cleaned grain from the cleaning system 26 is collected in a clean grain pan 37 and fed by means of a grain auger 38 to an elevator (not shown) that conveys the grain into the grain tank 28.

Figure 2:
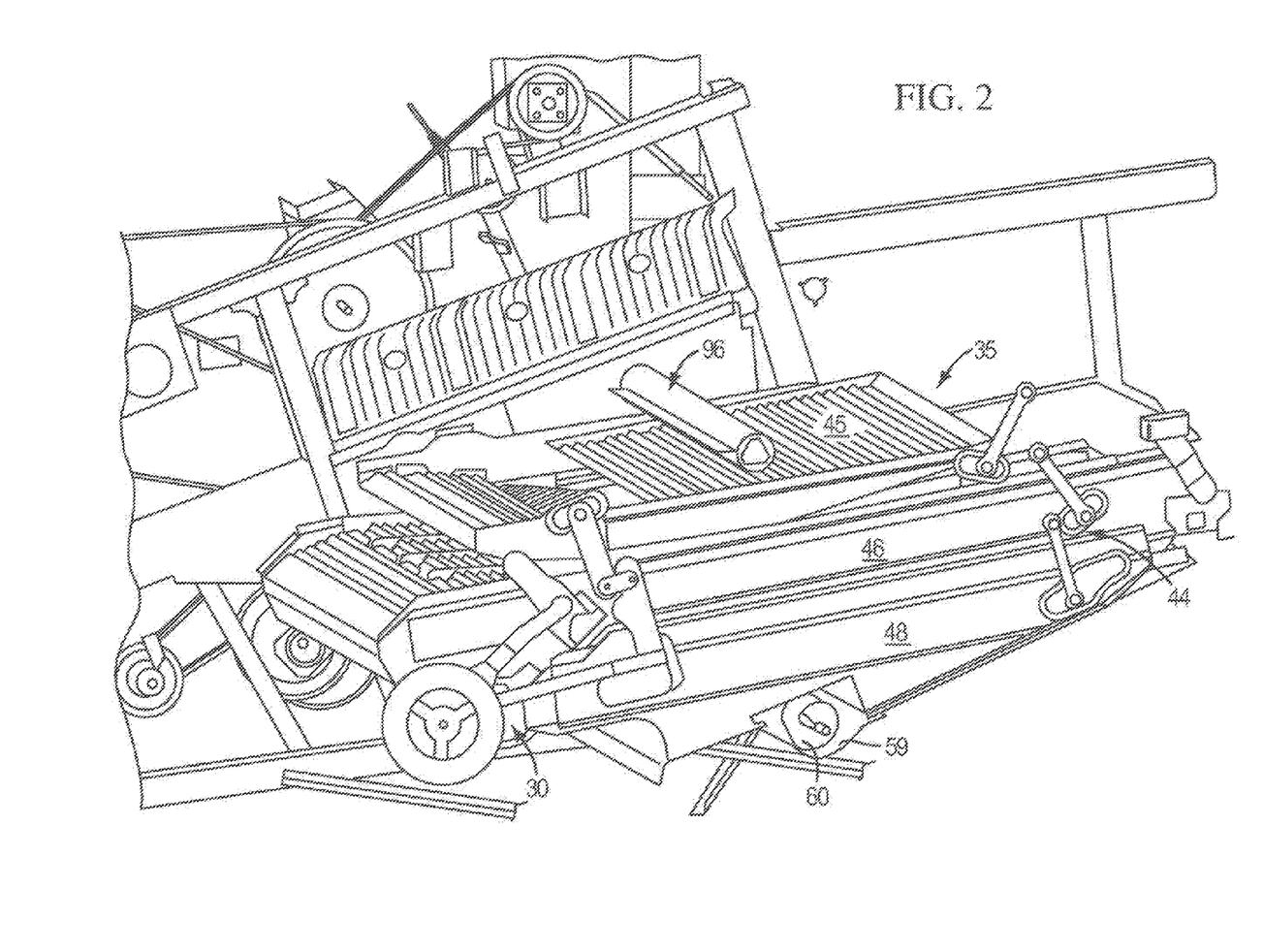
FIG. 2 is a near side, fragmentary, perspective view of a crop cleaning system taken from the combine shown in FIG. 1.

As illustrated in FIG. 2, the cleaning system 26 comprises a cleaning shoe 35 and a cleaning fan 30. The cleaning shoe 35 comprises a frame 44 holding a return pan 45, a chaffer sieve 46 and a lower, secondary sieve 48.

The illustrated cleaning shoe 35 is a reciprocating shoe wherein the return pan 45, the chaffer sieve 46, and the secondary sieve 48 are reciprocated, oscillated or shaken to move crop material and to enhance separation through the sieves.

The chaffer 46 and the lower, secondary sieve 48 are arranged one above the other. The sieves 46, 48 oscillate or otherwise move during the operation of the cleaning shoe 35 in such a way that the harvested material separated by the threshing and separating device 24 is received on the side of the sieves 46, 48 which faces the threshing and separating device 24 and is additionally conveyed opposite the driving direction of the combine 10. In order to achieve an optimal cleaning effect of the cleaning shoe 35, the rotational speed of the blower and the width of the openings in the sieves 46, 48 can be varied.

Combine cleaning systems are disclosed in U.S. Pat. Nos. 4,531,528 and 6,672,957; and U.S. Pub. App. Nos. 2002/0128054 and 2005/0164755, all herein incorporated by reference.

Figure 3:
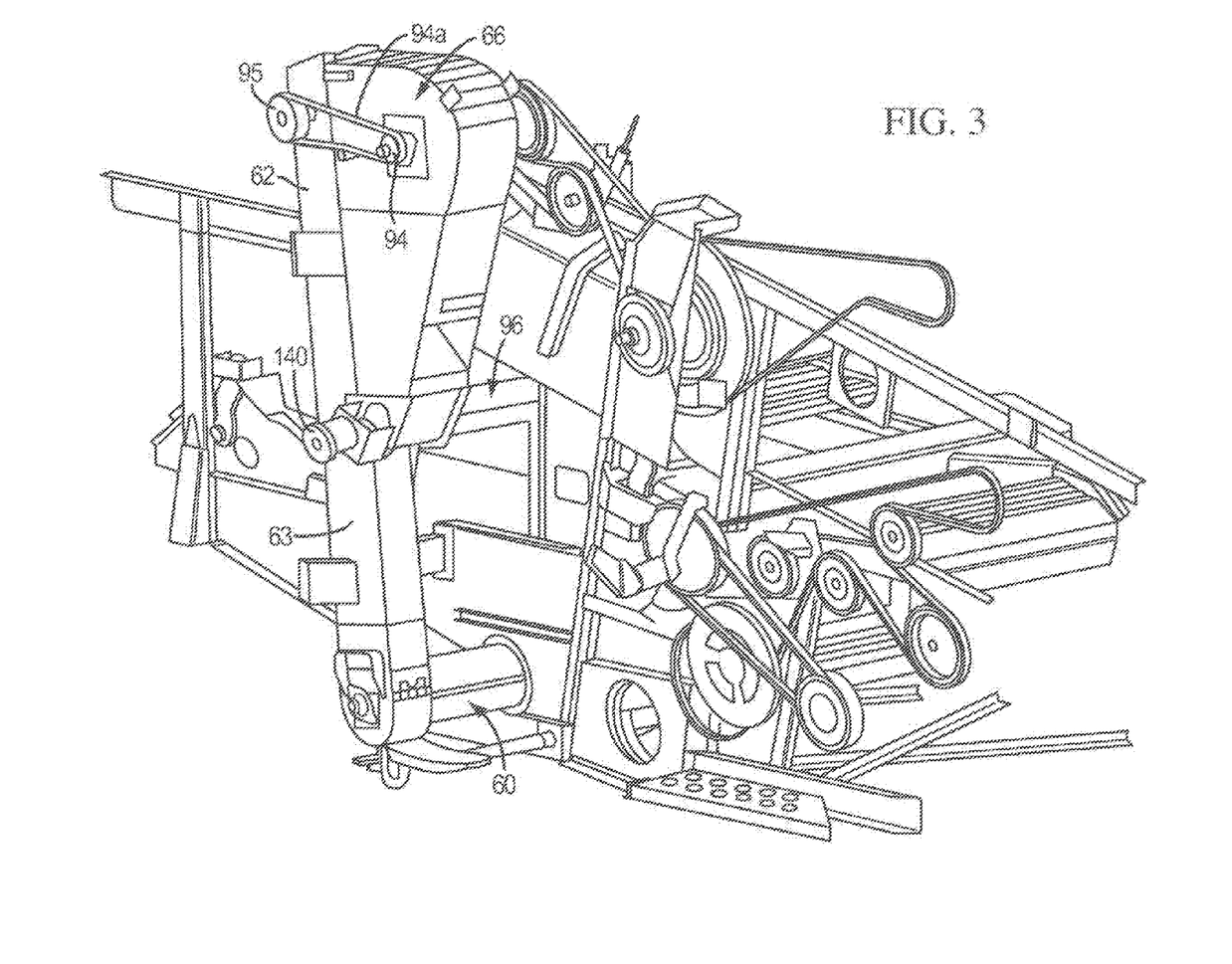
FIG. 3 is a far side, fragmentary, perspective view of a the crop cleaning system of FIG. 2.
Figure 4:
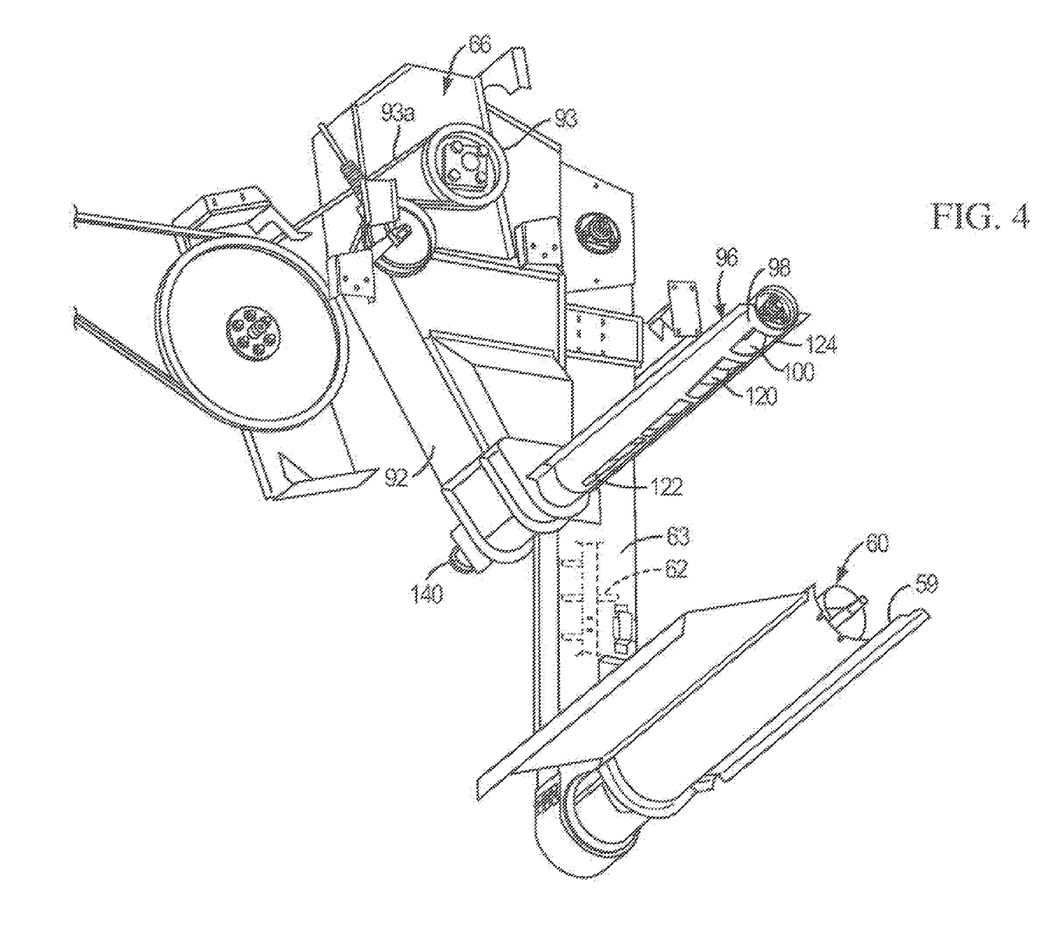
FIG. 4 is a near side, fragmentary, perspective view of a tailings re-threshing system taken from FIG. 2.
Figure 5:
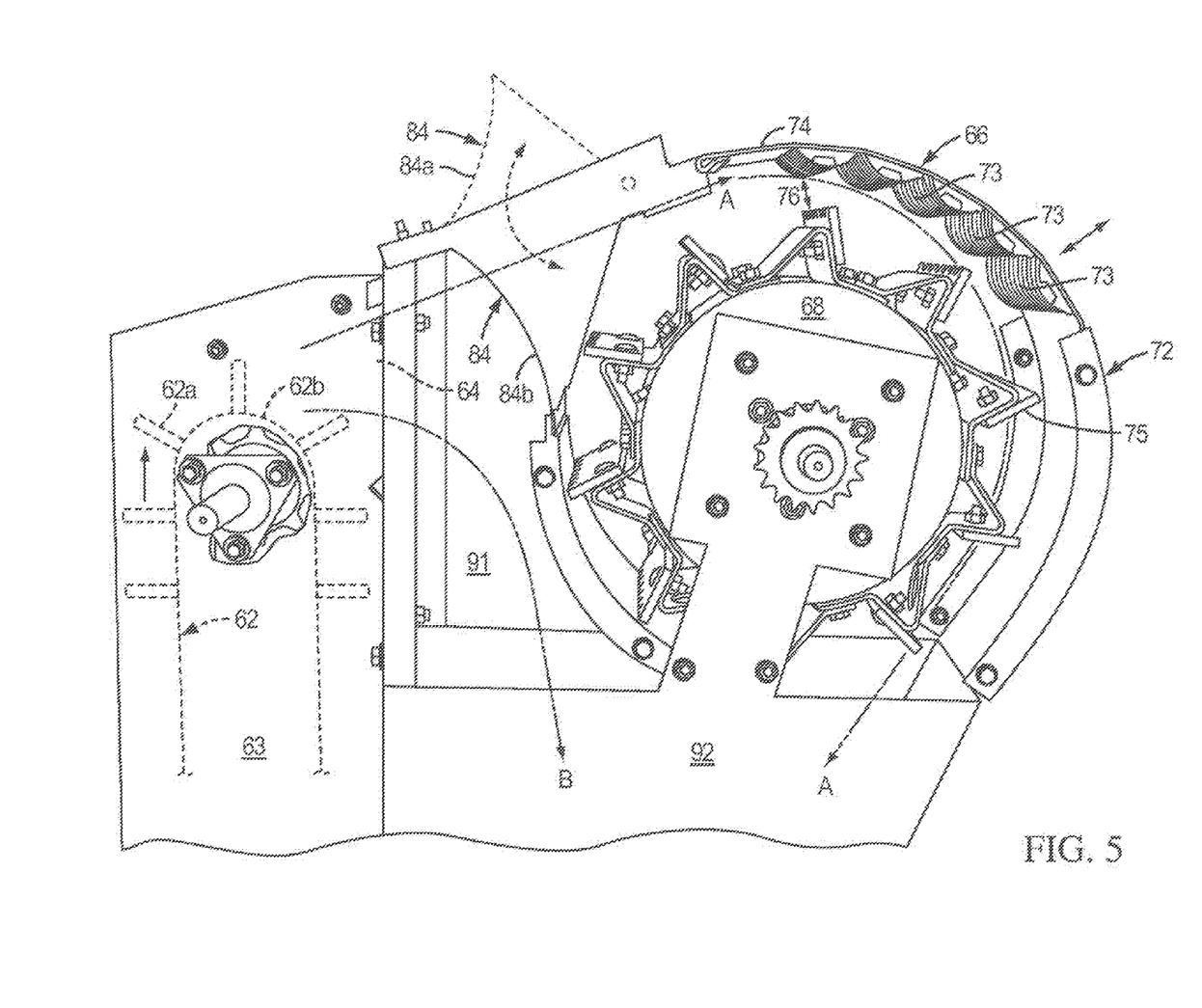
FIG. 5 is a far side, enlarged, fragmentary perspective view of re-threshing rotor and housing taken from FIG. 3, with near side and far side covers removed to view the rotor.

FIGS. 2-5 illustrate non-threshed crop portions or tailings are collected in a tailings pan 59 and moved by a tailings auger 60 to a circulating chain elevator 62 within a housing 63 which elevates the tailings to a discharge opening 64 by way of paddles 62a attached to an endless chain 62b (FIG. 5). Such an elevator is known and is disclosed for example as elevator 54 in U.S. Pat. No. 5,497,605, herein incorporated by reference. As individual paddles 62a carried by the circulating chain turn over at a top of their vertical travel, the paddles 62a propel or fling the tailings into a re-threshing apparatus 66 that comprises a re-threshing rotor 68 driven in rotation within a re-threshing housing 72.

Re-threshing rotor 68 rotates within re-threshing housing 72. The housing 72 includes rasp bars 73 on an adjustable wall 74. There are no perforations in the wall 74. The rotor includes bars 75 that pass by the rasp bars 73. The rotor can be equipped with different bars depending on the nature of the crop being processed, including rasp bars for difficult threshing crops, swept back bars to allow material to be pushed against the stationary rasp bars for threshing while still allowing good material handling characteristics, or serrated bars for wet material movement.

Gap 76 between the bars 75 and the rasp bars 73 can be selectively adjusted by moving wall 74 either towards or away from rotor 68. Selecting gap 76 controls the yield and throughput for re-threshing a particular crop. Re-threshing yield is increased by decreasing gap 76 so that more clean grain is separated from tailings. However, decreasing gap 76 to increase yield decreases throughput, since clearances are reduced. Thus, gap 76 should be set for particular crops to counterbalance throughput verses yield for re-threshing tailings.

A deflector 84 is provided within the housing 72 which is effective to cause tailings to bypass the re-threshing rotor 68 and re-threshing housing 72. The deflector 84 is shown in a first, standby position marked 84a (shown dashed) and a second, deployed position marked 84b. With the deflector 84 in the position marked 84a, re-threshing crop flow is thrown by the paddles of elevator 62 through the discharge opening 64 in a tangential direction indicated by arrow marked "A" into the re-threshing housing 72. With the deflector 84 in position marked 84b, bypass crop flow is thrown downward through a vertical bypass path 91 and into a discharge chute 92 in the direction indicated by arrow marked "B."

The rotor 68 is driven on one axial end by a pulley 93 driven by a belt 93a driven by the equipment drive power system of the combine on a near side of the housing 72.

The other axial end of the rotor 68 drives a pulley 94 that circulates a belt 94a, that drives a pulley 95 that drives the circulating chain 62b of the elevator 62 (FIG. 3).

Re-threshing crop flow "A" and/or bypass crop flow "B" exits the housing 72 downward through the discharge chute 92 to an auger 96. The auger 96 includes a tubular auger housing 98 and an auger screw 100.

The tubular auger housing 98 is arranged transversely across the cleaning system 26, particularly over the return pan 45. The auger housing includes a tapered slot formation 120 that has a far side small width 122 increasing to a near side maximum width 124. In this way, the tailings conveyed by the auger screw 100 from the chute 92 will be evenly distributed from out of the slot formation 120 transversely across the return pan.

The auger screw 100 is driven in rotation by a sprocket or pulley 140 located on its far side end that is driven by a belt or chain (not shown) from the equipment drive power system of the combine.

Figure 6A:
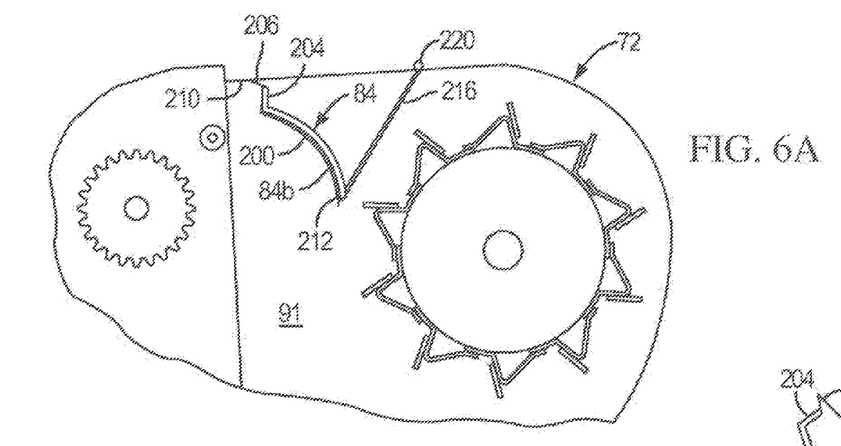
FIG. 6A is a diagrammatic cross-sectional view of a deflector in the deployed position.
Figure 6B:
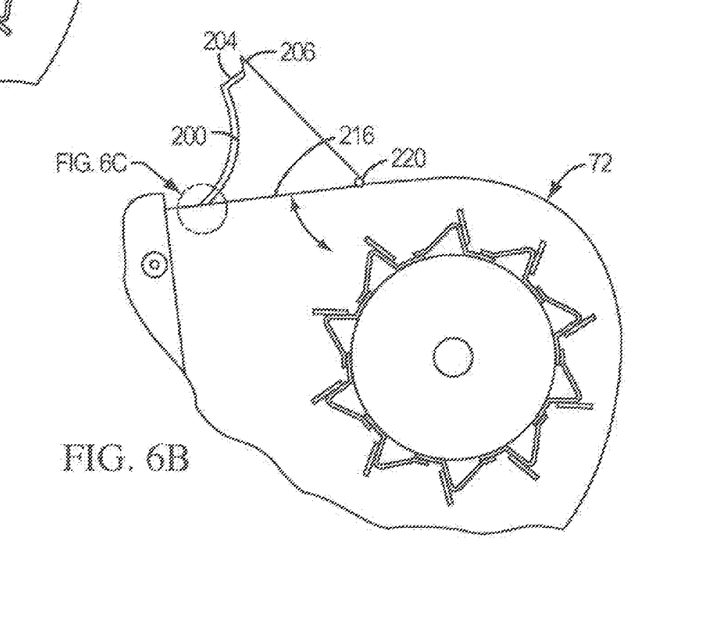
FIG. 6B is a diagrammatic cross-sectional view of the deflector of FIG. 6A rotated to a standby position.
Figure 7:
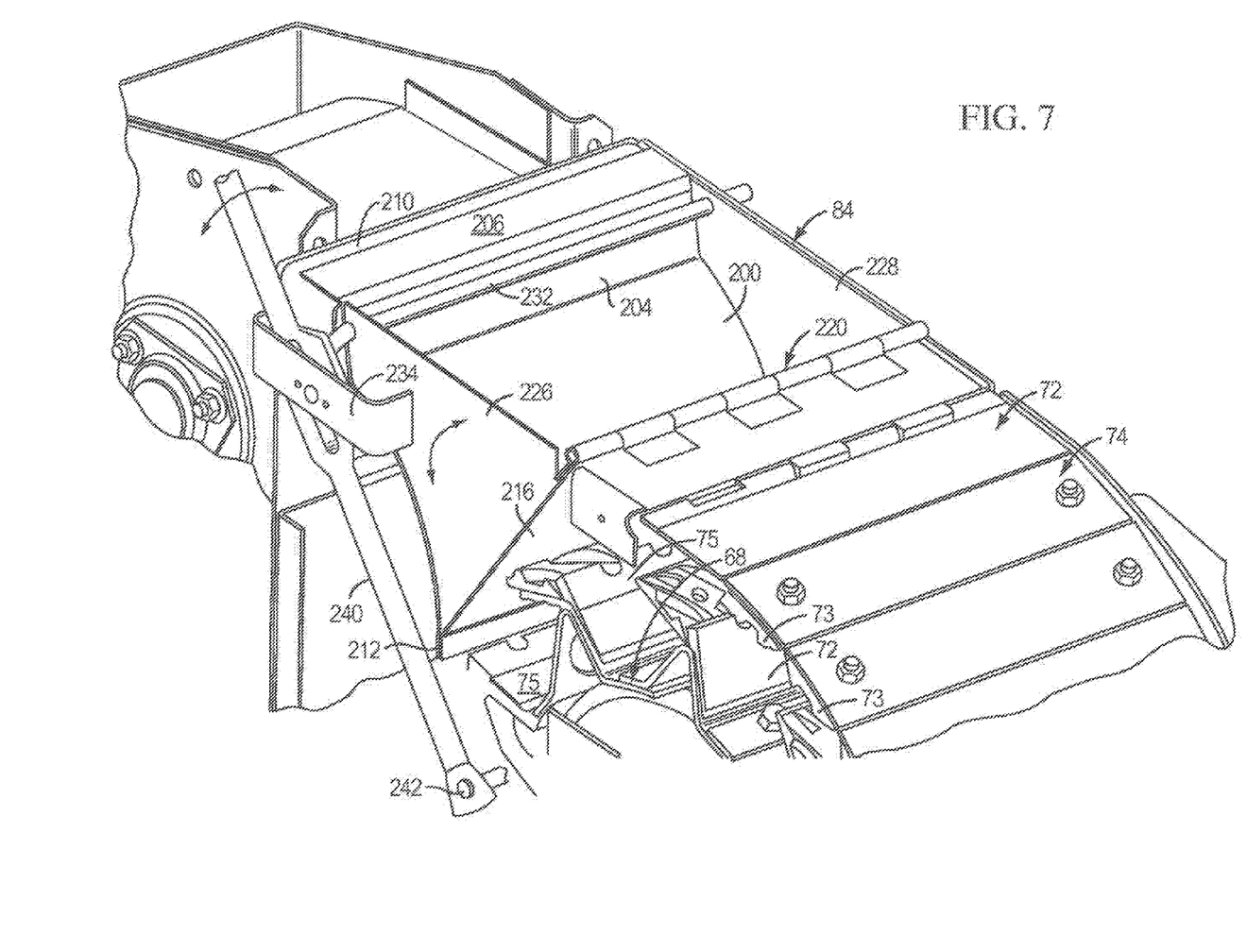
FIG. 7 is an enlarged fragmentary view of the deflector shown in FIG. 6A in the deployed position.

FIGS. 6A-7 illustrate the deflector 84 in more detail. As shown in FIG. 6A, the deflector 84 is in the deployed position 84b. The deflector 84 includes an arcuate deflecting plate 200 that smoothly deflects tailings thrown in a horizontal direction to a downward direction into the bypass path 91. The plate 200 is formed with a vertical support plate 204 having a horizontal lip 206. The lip 206 rests on, and substantially seals against, a stationary housing plate 210 of the housing 72. The plate 200 also includes an opposite end lip 212. An inclined brace plate 216 is connected at one end to the plate 200 and at an opposite end to a hinge assembly 220 that is secured to the housing 72. The hinge assembly 220 allows the deflector 84 to pivot between the two positions shown in FIGS. 6A and 6B. As shown in FIG. 7, the plates 200, 216 are connected together by sideplates 226, 228 to create a rigid assembly. A lift bar 232 penetrates through the sideplates 226, 228 and is connected at one end to a bracket 234. The deflector 84 can be pivoted by force exerted on the bracket 234. In this regard, a lever 240 (shown schematically only) can be pivotally mounted to the housing 72 and pivoted about a pivot point 242 with respect to the housing 72 to pivot the deflector 84.

Figure 6C:
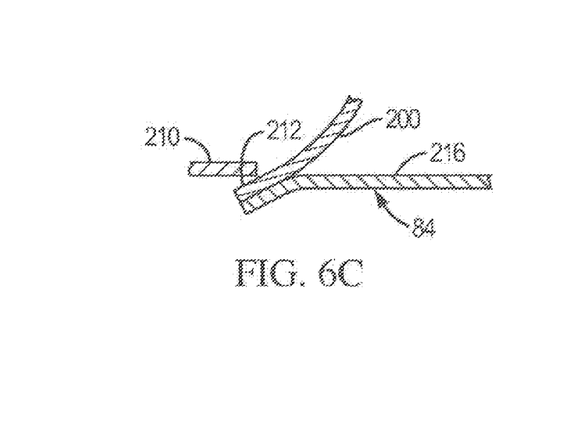
FIG. 6C is an enlarged sectional taken from FIG. 6B; and d

When the deflector 84 is pivoted to the standby position of FIG. 6B the lip 212 substantially seals against a bottom of the wall 210 as shown in FIG. 6C. The lever 240 can be fixed to fix the deflector at a desired pivotal position corresponding to either of the positions shown in FIGS. 6A and 6B by bolting the lever to the housing at the desired position, or by providing some other releasable fixation means.

The plates 200, 204, 206, 212, 216, 226, 228 are typically metal plates that can be formed and assembled using fasteners, bending, rivets, welding or other methods known to those skilled in the art.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A combine harvester comprising:
a threshing section for threshing harvested crop material received into said combine;
a cleaning section for separating threshed grain from incompletely threshed tailings;
a re-threshing, section for receiving tailings through an inlet and delivering re-threshed tailings through an outlet;
said threshing section occupying a first area, said re-threshing section occupying a second area, said first area is at least partially geometrically non-coextensive with said second area;
a first delivery path for receiving tailings from the cleaning section and transporting the tailings to the inlet of the re-threshing section;
a second delivery path for receiving re-threshed tailings from said outlet and delivering said re-threshed tailings to said cleaning section;
said second delivery path also for receiving tailings from a bypass delivery path;
said bypass delivery path connecting said first delivery path to said second delivery path; and
a deflector arranged to selectively open or close said inlet.

2. The combine harvester according to claim 1, wherein said re-threshing section comprises a rotor having first threshing elements extending at least partially away from said rotor and a housing having a wall with second threshing elements facing said first threshing elements.

3. The combine harvester according to claim 2, wherein said first delivery path includes a mechanism configured to throw tailings into said housing between said first and second threshing elements in a direction substantially tangential to said rotor.

4. The combine harvester according to claim 3, wherein said mechanism is for sending tailings into said bypass delivery path when said inlet is closed by said deflector.

5. The combine harvester according to claim 2, wherein said first delivery path comprises a vertically arranged elevator that comprises paddles circulating around a chain, where at a top of said chain said paddles turn over to throw tailings into said housing.

6. The combine harvester according to claim to 2, wherein said deflector comprises a plate pivoted at one end to said housing.

7. The combine harvester according to claim 2, wherein said second delivery path comprises a vertical chute below said housing.

8. The combine harvester according o claim 7, wherein said bypass delivery path comprises a substantially vertical passage between said inlet and said vertical chute.

9. The combine harvester according to claim 1, wherein said re-threshing section comprises a rotor and a housing that at least partially surrounds said rotor, said rotor and said housing configured to thresh tailings therebetween, wherein said deflector is configured to be selectively moved between a standby position wherein tailings are delivered between said rotor and said housing by said first delivery path and a deployed position wherein tailings are deflected into said bypass delivery path.

10. The combine harvester according to claim 9, wherein said deflector comprises an arcuate plate that when moved to the deployed position closes the inlet and smoothly deflects tailings into said bypass delivery path.

11. A re-threshing mechanism for a combine comprising:
a first delivery path configured to receive tailings and to transport tailings to an inlet of a re-threshing section;
a second delivery path configured to receive re-threshed tailings from an outlet of said re-threshing section and to deliver said re-threshed tailings to a cleaning section;
said second delivery path also configured to receive tailings from a bypass delivery path;
said bypass delivery path connecting said first delivery path to said second delivery path; and,
a deflector having and open and a closed position, in said closed position the deflector closes said inlet.

12. The re-threshing mechanism according to claim 11, wherein said re-threshing section comprises a rotor having first threshing elements extending at least partially away from a rotor surface and a housing having a wall with second threshing elements facing said first threshing elements.

13. The re-threshing mechanism according to claim 12, wherein said first delivery path includes a mechanism configured to throw tailings into said housing between said first and second threshing elements in a direction substantially tangential to said rotor.

14. The re-threshing mechanism according to claim 13, wherein said mechanism is for sending tailings into said bypass delivery path when said inlet is closed by said deflector.

15. The re-threshing mechanism according to claim 12, wherein said first delivery path computes a vertically arranged elevator that comprises paddles circulating around a chain, where at a top of said paddles turn over to throw tailings into said housing.

16. The re-threshing mechanism according to claim 12, wherein said deflector comprises a plate pivoted at one end to said housing.

17. The re-threshing mechanism according to claim 12, wherein said second delivery path comprises a vertical chute below said housing.

18. The re-threshing mechanism according to claim 17, wherein said bypass delivery path comprises a substantially vertical passage between said inlet and said vertical chute.

19. The re-threshing mechanism according to 11, wherein said re-threshing section comprises a housing at least partially surrounding a rotor, said rotor and said housing for threshing tailings therebetween,
    said deflector having a standby position for directing tailings into said re-threshing section between said rotor and said housing, and
    said deflector also having a deployed position for directing tailings into said bypass delivery path.

20. The re-threshing mechanism according to claim 19, wherein said deflector comprises an arcuate plate that when moved to the deployed position closes the inlet and smoothly deflects tailings into said bypass delivery path.

21. A method of selectively re-threshing tailings in a combine harvester comprising the steps of:
    providing a re-threshing section having an inlet and an outlet;
    providing a bypass path around said re-threshing section;
    throwing tailings at said inlet;
    selectively directing tailings into either said re-threshing section or into said bypass path to bypass said re-threshing section;
    re-threshing tailings that are delivered into said re-threshing section.

22. The method according to claim 21, wherein said re-threshing step is further defined by the steps of:
    providing a rotary re-threshing device that rotates within a housing, wherein re-threshing takes place between said rotary re-threshing device and said housing.

23. The method according to claim 22, wherein the step of throwing comprises the step of throwing tailings in a direction substantially tangential to said rotary threshing device.

24. The method according to claim 23, wherein said step of selectively directing is further defined by the steps of:
    providing a deflector having at least two positions, a standby position that allows tangential entry of tailings into said housing, and a deployed position that blocks entry of tailings into said housing and directs tailings into said bypass path.

* * * * *